(12) United States Patent
Vaughn et al.

(10) Patent No.: US 9,244,469 B2
(45) Date of Patent: Jan. 26, 2016

(54) AUTOMATED HVAC SYSTEM FUNCTIONALITY TEST

(71) Applicants: Tyrell Craig Vaughn, Austin, TX (US); Colin Bester, Dripping Springs, TX (US)

(72) Inventors: Tyrell Craig Vaughn, Austin, TX (US); Colin Bester, Dripping Springs, TX (US)

(73) Assignee: Siemens Industry, Inc., Alpharetta, GA (US)

(*) Notice: Subject to any disclaimer, the term of this patent is extended or adjusted under 35 U.S.C. 154(b) by 353 days.

(21) Appl. No.: 13/894,165

(22) Filed: May 14, 2013

(65) Prior Publication Data
US 2013/0338836 A1 Dec. 19, 2013

Related U.S. Application Data

(60) Provisional application No. 61/647,210, filed on May 15, 2012.

(51) Int. Cl.
*G05D 23/19* (2006.01)
*F24F 11/00* (2006.01)

(52) U.S. Cl.
CPC ............ *G05D 23/19* (2013.01); *F24F 11/0086* (2013.01); *F24F 2011/0052* (2013.01); *F24F 2011/0057* (2013.01); *F24F 2011/0064* (2013.01); *F24F 2221/54* (2013.01)

(58) Field of Classification Search
USPC .............. 700/276; 702/122; 236/51; 705/305
See application file for complete search history.

(56) References Cited

U.S. PATENT DOCUMENTS

| | | | | |
|---|---|---|---|---|
| 5,729,747 A * | 3/1998 | Tsukakoshi | .................... | 717/106 |
| 5,947,371 A | 9/1999 | Lee | | |
| 6,535,838 B2 * | 3/2003 | Abraham et al. | ............. | 702/183 |
| 6,782,345 B1 * | 8/2004 | Siegel et al. | ................... | 702/183 |
| 7,424,345 B2 * | 9/2008 | Norbeck | ............. | F24F 11/0086 700/276 |
| 2003/0101262 A1 * | 5/2003 | Godwin | ........................ | 709/224 |
| 2003/0176989 A1 * | 9/2003 | Matsuda | ........................ | 702/184 |
| 2003/0195640 A1 * | 10/2003 | Krocker et al. | .................. | 700/26 |
| 2005/0228607 A1 * | 10/2005 | Simons | .......................... | 702/122 |
| 2007/0185686 A1 | 8/2007 | Singhal et al. | | |
| 2007/0208461 A1 | 9/2007 | Chase | | |
| 2010/0076605 A1 * | 3/2010 | Harrod | ............... | G05D 23/1905 700/276 |
| 2011/0202180 A1 * | 8/2011 | Kowald | ............... | F24F 11/0009 700/276 |
| 2014/0074730 A1 * | 3/2014 | Arensmeier | ........ | F24F 11/0086 705/305 |

FOREIGN PATENT DOCUMENTS

| | | |
|---|---|---|
| EP | 2 012 288 A2 | 1/2009 |
| WO | 2005/100874 A2 | 10/2005 |

OTHER PUBLICATIONS

PCT Search Report dated Aug. 29, 2013, for PCT application No. PCT/US2013/041103. (10 pages).

* cited by examiner

*Primary Examiner* — Kidest Bahta

(57) ABSTRACT

Systems, methods, and mediums perform automated functionality testing for a heating ventilation and air conditioning (HVAC) system. A method includes receiving a user input to test one of a heating or cooling functionality of the HVAC system. The method also includes identifying an amount to change a setpoint for a zone controller for the HVAC system based on the user input. The method further includes changing the setpoint for the zone controller to force the HVAC system into one of a heating mode and a cooling mode in accordance with the user input. Additionally, the method includes storing data from the HVAC system operating in the one of the heating mode and the cooling mode.

17 Claims, 6 Drawing Sheets

FIG. 3(continue)
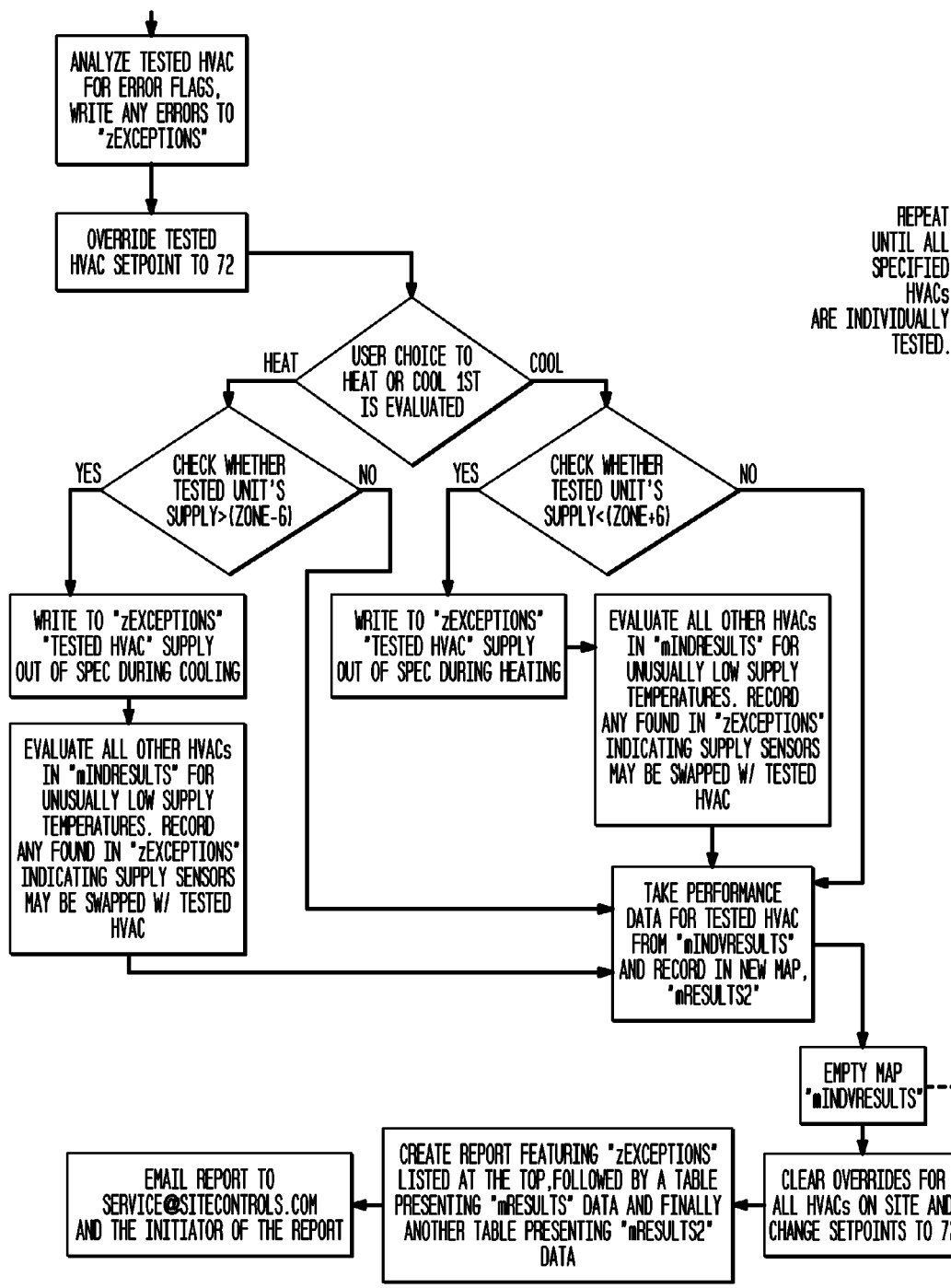

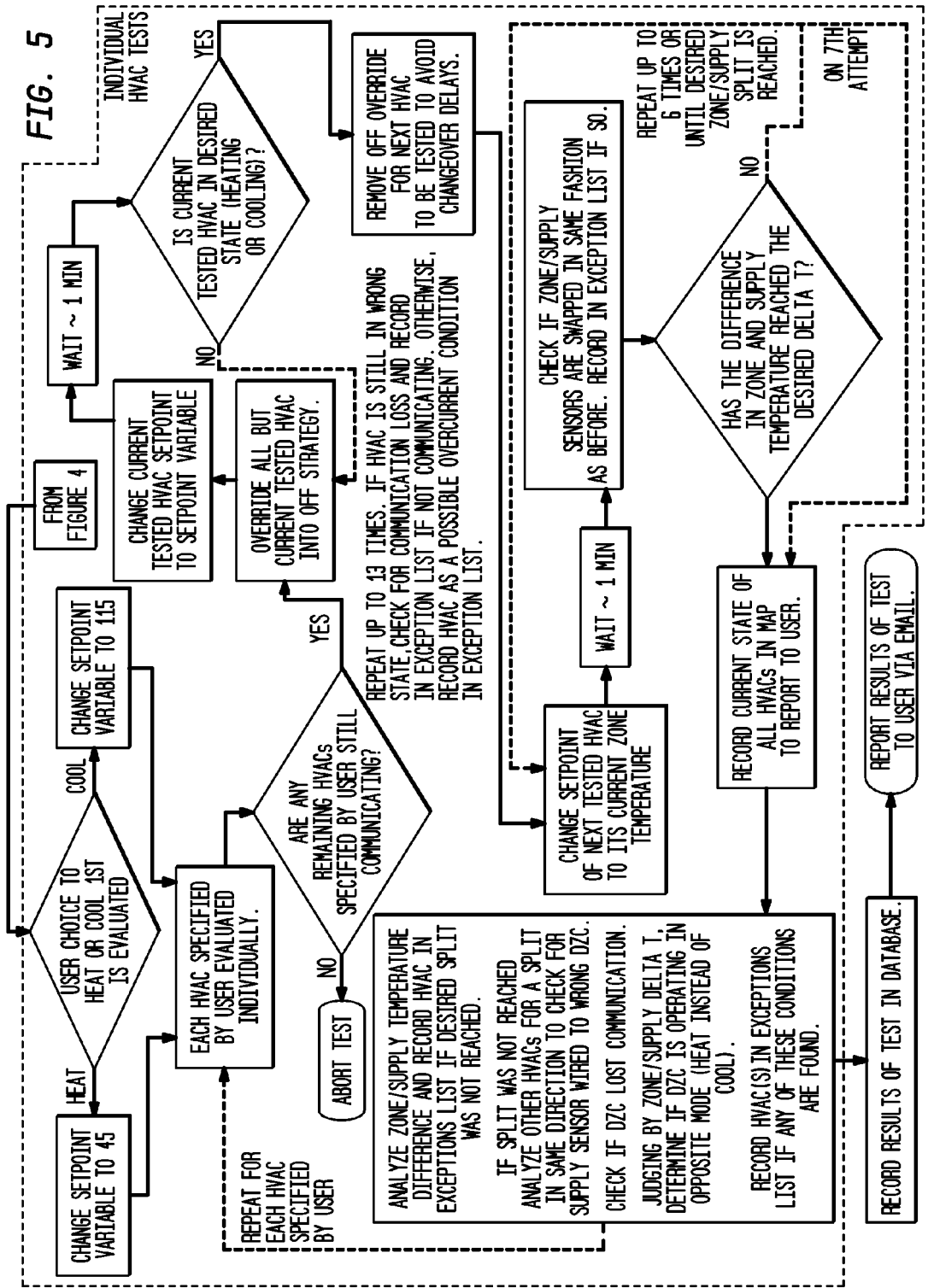

AUTOMATED HVAC SYSTEM FUNCTIONALITY TEST

CROSS REFERENCE TO RELATED APPLICATIONS AND CLAIM OF PRIORITY

This application claims priority to U.S. Provisional Patent Application Ser. No. 61/647,210, filed May 15, 2012, entitled "Automated HVAC System Functionality Test", which is hereby incorporated by reference.

TECHNICAL FIELD

The present disclosure is directed, in general, to building automation systems and, more particularly, to automating heating and cooling tests of heating, ventilation, and air conditioning (HVAC) equipment.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. One example of a building automation system is the Site Controls Controller, available from Siemens Industry, Inc. Building Technologies Division of Buffalo Grove, Ill. ("Siemens"). In this system, several control stations connected via an Ethernet or another type of network may be distributed throughout one or more building locations, each having the ability to monitor and control system operation.

SUMMARY OF THE DISCLOSURE

Various disclosed embodiments include systems and methods for performing automated testing on an automated HVAC system. The testing may be performed on multiple HVAC systems simultaneously. The testing may be performed on individual HVAC systems. Errors and inconsistencies detected during simultaneous testing may be flagged for analysis during a test of an individual HVAC system.

Various embodiments include functionality for implementing the disclosed systems and methods in one or more data processing systems in one or more building automation systems.

Various embodiments include systems, methods, and mediums providing automated functionality testing for a heating ventilation and air conditioning (HVAC) system. A method includes receiving a user input to test one of a heating or cooling functionality of the HVAC system. The method also includes identifying an amount to change a setpoint for a zone controller for the HVAC system based on the user input. The method further includes changing the setpoint for the zone controller to force the HVAC system into one of a heating mode and a cooling mode in accordance with the user input. Additionally, the method includes storing data from the HVAC system operating in the one of the heating mode and the cooling mode.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 illustrates a flowchart of a process for performing automated testing of an individual HVAC system in accordance with various embodiments of the present disclosure.

DETAILED DESCRIPTION

The various figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include the ability to automate tests to a site's HVAC functionality while also providing installers and/or anyone performing testing on a site installation with a tool to verify instillation of a digital zone controller (DZC) and sensor as it relates to HVAC performance.

Disclosed embodiments provide installers and contractors with a way of automating hot and cold tests during a new site commissioning. Without automation these tests require up to 10 minutes waiting for a unit to heat or cool, another 10 minutes for the DZC's changeover delay timer to expire and an additional 10 minutes to wait for the unit to heat or cool again. Multiply this by a potential of twenty or more HVAC systems and the hot and cold tests alone could take several hours if done properly. Disclosed embodiments provide the automation of these tests will to free up an installer's time to perform other work while the testing information is captured.

Disclosed embodiments may schedule and run these tests across all sites of a given site to provide a way to highlight a problem or failing HVAC system(s).

Figure 1:
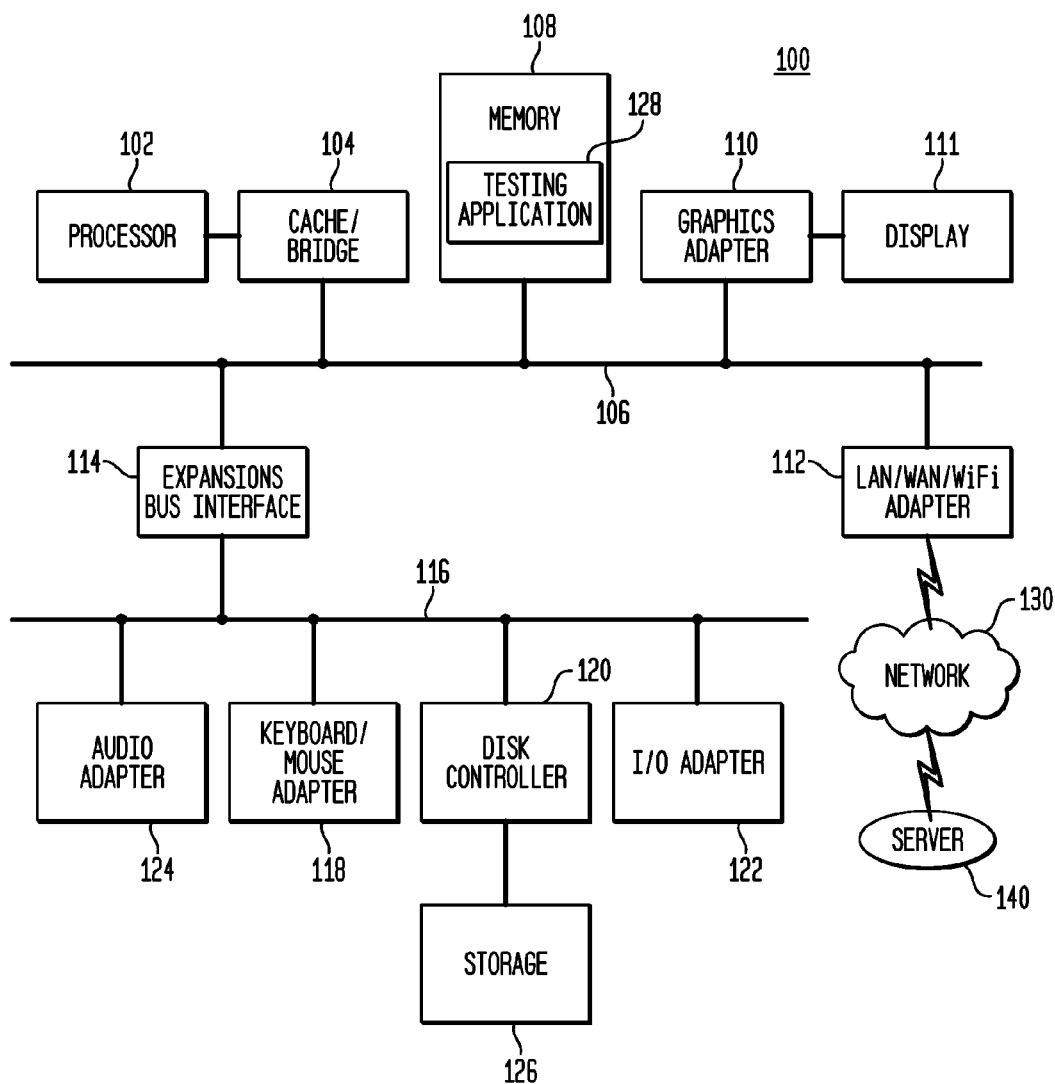
FIG. 1 depicts a block diagram of a data processing system in which an embodiment can be implemented.

FIG. 1 depicts a block diagram of a data processing system 100 in which an embodiment can be implemented, for example as a system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Memory 108 may comprise instructions of a testing application 128. The testing application 128 includes instructions and functionality for performing testing on one or more HVAC systems as described herein. The instructions for testing application 128 stored in memory 108 may be executed by processor 102 to perform one or more functions for implementing the automated testing of HVAC systems as described herein. For example, data processing system 100 may implement one or more of the functions of the blocks provided in FIGS. 2-4.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. For example, the data processing system 100 may connect to one or more DZC, sensors, and or HVAC systems and manage testing of these components. In some embodiments, data processing system 100 is at least a portion of a building automation system.

Figure 2:
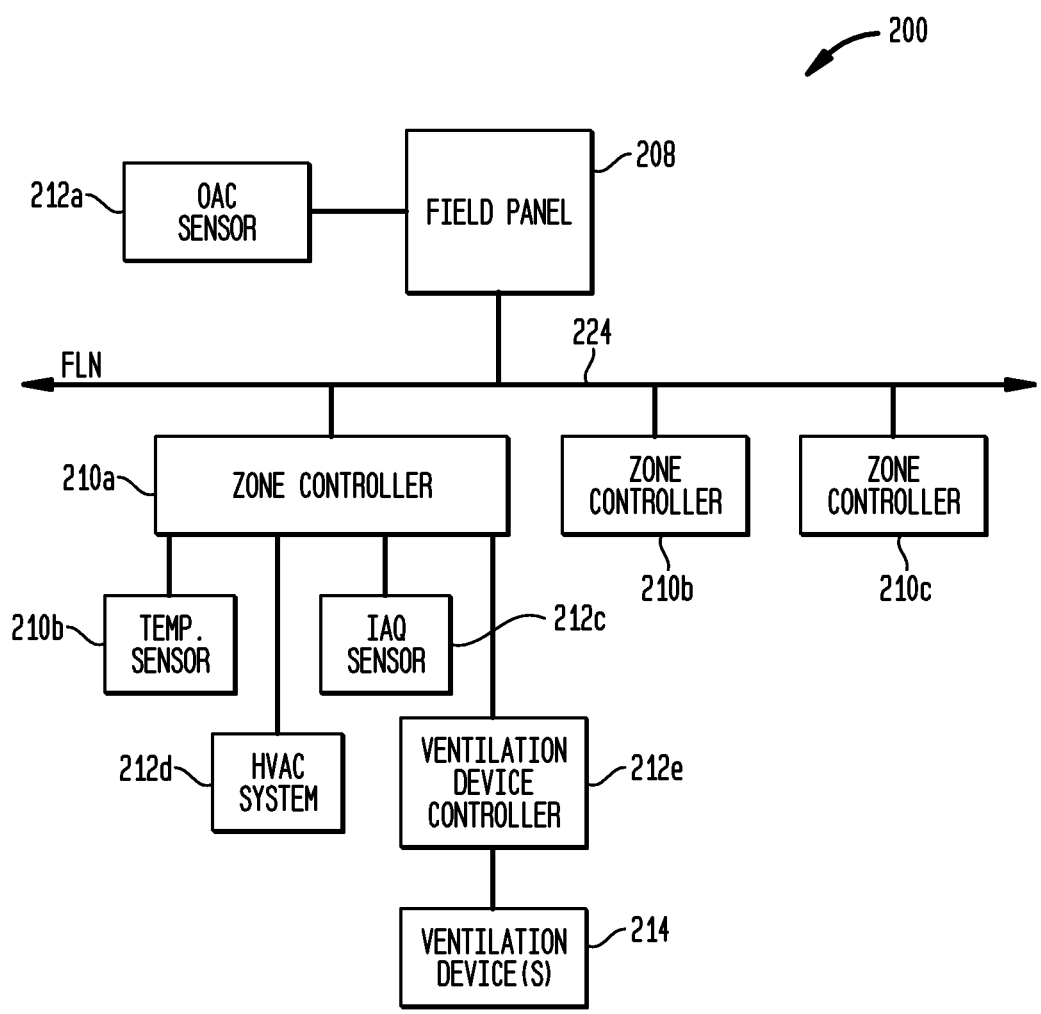
FIG. 2 illustrates at least a portion of a building automation system that is capable of automated testing of one or more HVAC systems in accordance with various embodiments of the present disclosure.

FIG. 2 illustrates at least a portion of a building automation system 200 that is capable of automated testing of one or more HVAC systems in accordance with the present disclosure. For the particular embodiment illustrated in FIG. 2, the system 200 comprises a field panel 208, three zone controllers 210a-c (e.g., a DZC), and five field devices 212a-e. However, it will be understood that the system 200 may comprise any suitable number of these components without departing from the scope of this disclosure.

For some embodiments, a building or other area in which an HVAC system is implemented may comprise a single zone. For these embodiments, the system 200 may comprise a single zone controller 210, such as the zone controller 210a. However, for other embodiments, such as in a relatively large building, the building may comprise two or more zones. For example, in a retail store, the public area may comprise one zone, while a back storage area may comprise another zone. For the illustrated example, the system 200 comprises three such zones, each of which has a corresponding zone controller 210a-c.

The embodiment of FIG. 2 comprises five field devices 212a-e. As described below, these field devices 212 comprise an outside air conditions (OAC) sensor 212a, a temperature sensor 212b, an indoor air quality (IAQ) sensor 212c, an HVAC system 212d, and a ventilation device controller 212e. Although the illustrated embodiment shows only the zone controller 210a coupled to a temperature sensor 212b, an IAQ sensor 212c, an HVAC system 212d and a ventilation device controller 212e, it will be understood that each of the zone controllers 210b and 210c may also be coupled to similar field devices 212b-e for its associated zone.

For some embodiments, the field panel 208 may be coupled to the OAC sensor 212a. The OAC sensor 212a is configured to sense parameters, such as temperature, humidity and/or the like, associated with the air outside the building. The OAC sensor 212a is also configured to generate an OAC signal based on the outside air conditions and send the OAC signal to the field panel 208. For other embodiments, the OAC sensor 212a may be coupled to one of the zone controllers 210 or other component of the system 200, such as a site controller, and may be configured to send the OAC signal to that other component. For some embodiments, such as those that provide conventional demand control ventilation, the OAC sensor 212a may be coupled to the zone controller 210a and the system 200 may be provided without the FLN 224. For these embodiments, the zone controllers 210 may be independent from, and incapable of communicating with, the other zone controllers 210.

The temperature sensor 212b is configured to sense the temperature of the zone associated with the zone controller 210a and to report the sensed temperature to the zone controller 210a. The IAQ sensor 212c is configured to sense the level of $CO_2$ and/or other contaminants in the zone and to report the sensed contaminant level to the zone controller 210a. For some embodiments, the IAQ sensor 212c may be configured to sense the level of contaminants in the entire building. For these embodiments, the system 200 may comprise a single IAQ sensor 212c coupled to a single zone controller 210a, a field panel 208 or other suitable component, instead of an IAQ sensor 212c coupled to each zone controller 210a-c. The HVAC system 212d may comprise a rooftop HVAC unit, an air handler unit, or any other suitable type of unit capable of providing heating, ventilation, and cooling for the building. In addition, it will be understood that the system 200 may comprise any combination of various types of HVAC systems. For example, the HVAC system 212d may comprise a rooftop HVAC unit, while the zone controller 210b may be coupled to an air handler unit and the zone controller 210c may be coupled to yet another type of HVAC system.

The ventilation device controller 212e is coupled to a ventilation device or devices 214 and is configured to control the operation of the ventilation device 214. For some embodiments that provide conventional demand control ventilation, the ventilation device 214 may comprise a damper on the HVAC system 212d, and the ventilation device controller 212e may comprise a damper actuator that is configured to open and close the damper. For these embodiments, the damper actuator may open or close the damper based on a ventilation signal from the zone controller 210a, as described in more detail below.

The zone controller 210a may be installed in or near a room in which the HVAC system 212d is located, in a back office, or in any other suitable location in the building. The OAC sensor 212a may be installed outside the building. The temperature sensor 212b may be installed in the zone associated with the zone controller 210a. The IAQ sensor 212c may be installed in the zone associated with the zone controller 210a or, for embodiments in which only a single IAQ sensor is implemented in the building, in a central location in the building. The HVAC system 212d may be installed on the roof of the building, adjacent to the building, or in any other suitable location. The ventilation device controller 212e may be installed in the zone associated with the zone controller 210a and/or near the ventilation device 214. It will be understood that each of the components of the system 200 may be located in any suitable location without departing from the scope of the present disclosure.

The zone controller 210a is configured to monitor the temperature of its zone based on a temperature signal from the temperature sensor 212b and to monitor the contaminant-level of the zone based on an IAQ signal from the IAQ sensor 212c. The zone controller 210a is also configured to activate or deactivate the HVAC system 212d to provide heating or cooling based on the temperature signal. The zone controller 210a is also configured to switch the zone between a ventilation mode and an economizing mode based on the temperature signal provided by the temperature sensor 212b and the OAC signal provided by the OAC sensor 212a, which may be provided via the field panel 208 for some embodiments.

Figure 3:
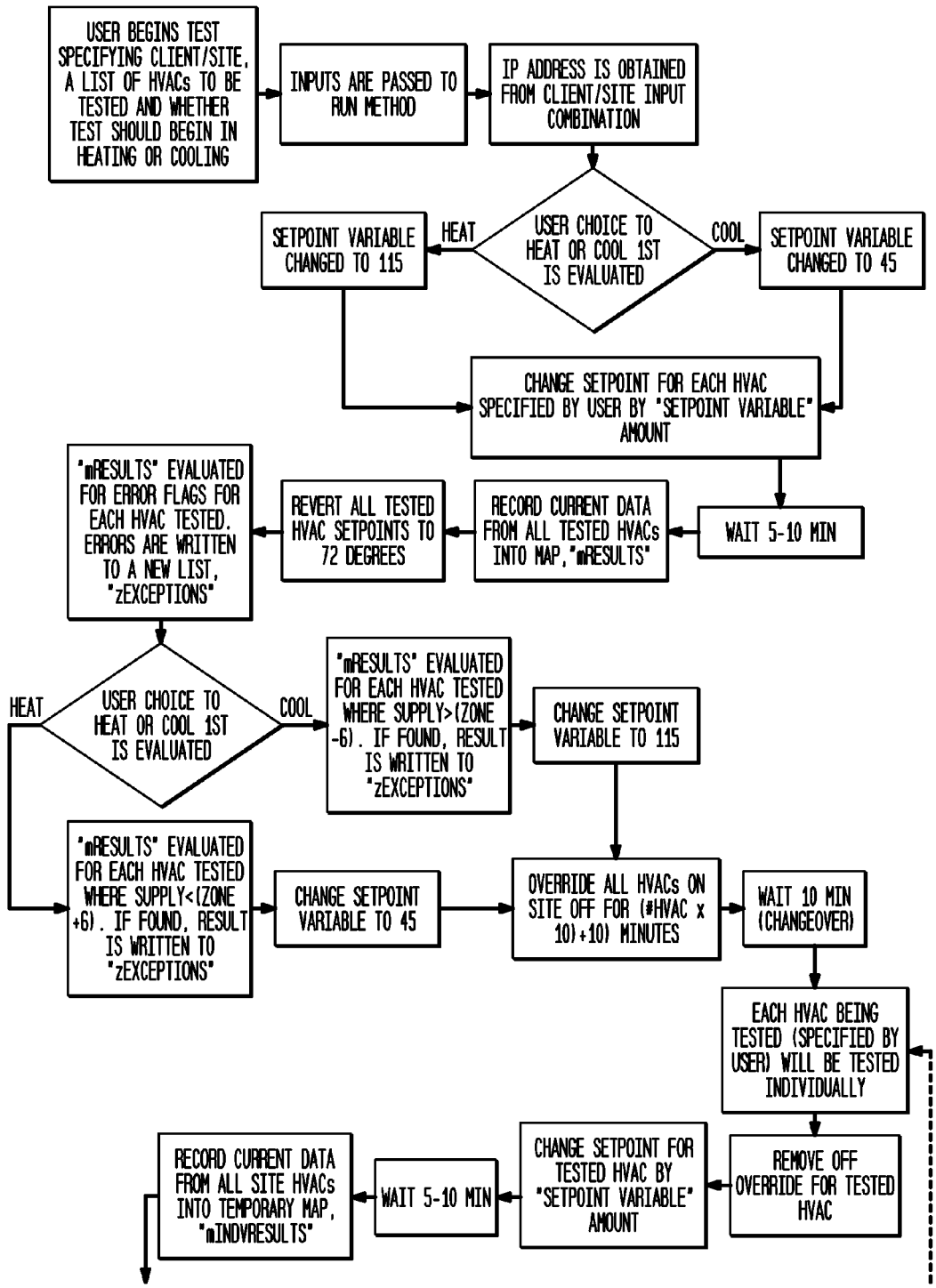
FIG. 3 illustrates a flowchart of a process for performing heating and cooling tests of HVAC system.
Figure 4:
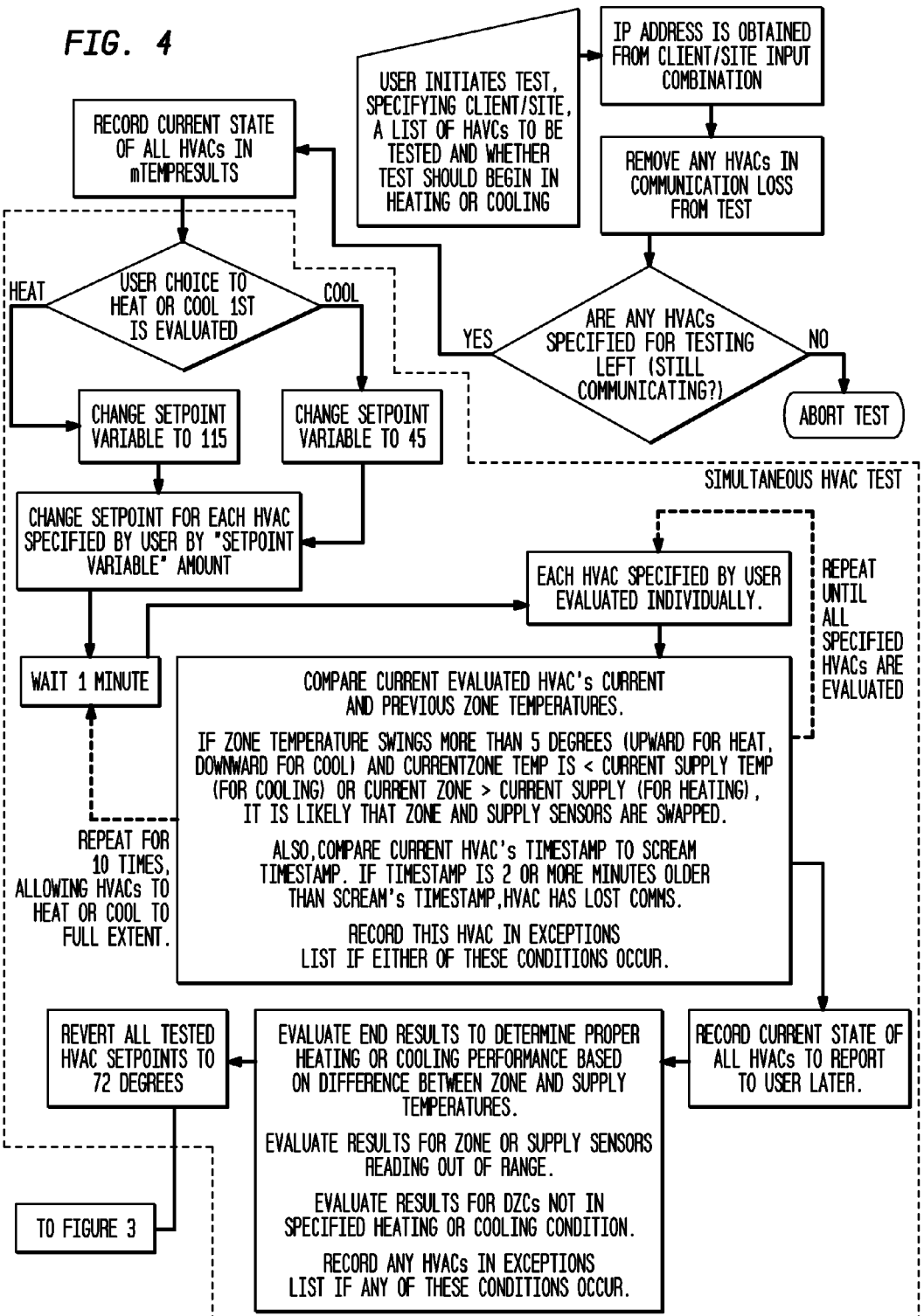
FIG. 4 illustrates a flowchart of a process for performing simultaneous automated testing of multiple HVAC systems in accordance with various embodiments of the present disclosure.

FIGS. 3-5 illustrates flowcharts of processes for testing HVAC systems according to various embodiments. Service technicians and installers should have access to initiate these tests on a single site. If "All" is specified for the list of HVACs to be tested, a list of all HVAC keys, "zHVAC" will be generated from a RequestData request. For example, Table 1 provides a list of inputs for tests and who may initiate tests.

TABLE 1

| Variable | Type | Comments |
|---|---|---|
| sSchema | String | Client identifier |
| iSite | Integer | Site ID |
| zHVAC | List | List of HVACs being tested |
| bCool | Boolean | Evaluate to TRUE if test is to start in cooling. |

A date/time field may be available to schedule a test ahead of time but should default to current time. Prescheduled tests should only be available to qualified service technicians and should be capable of running on multiple sites (or locations) within a given client (or for a given entity). Tests of this nature should be available through a separate report from the one-off, single site tests. Here, the multi-site report will accept the same inputs as the previously described test where the site list is passed as a list, (e.g., named "zSites"), rather than an integer and the scheduled date is passed as a date object, (e.g., named "oDate").

The following flowchart descriptions and analytical rules are for the intention of describing examples of specific ways that automated testing may occur. The following examples are indented as illustrations not as limitations to the various embodiments that can be implemented according to the principals of the present disclosure.

After the required inputs are passed to the run method, the single site report will perform the following: (1) first the controller will force all units into heat or cool (based on user choice) and add results into a map which may be called, "mResults." The variables "iSite" and "iSchema" may be used to obtain the IP address of the test site. The following functionality may be performed:

a. Define string "sSetpoint"
b. If "bCool," "sSetpoint" = 45
c. Else, "sSetpoint" = 115
d. Define map "mResults"
e. For each "sHVACKey" in "zHVAC" a doControl setpoint override will be sent to force a temporary setpoint change to amount "sSetpoint."
   i. Delay 5-10min
   ii. Info for each "sHVACKey" in "zHVAC," RequestData will be parsed, recording "TimeStamp," "Zone," "Supply," "sRelayState," "sRuntime" and "RequestDataErr" into a list, then added into map, "mResults," mapped by "sHVACKey."
f. For each "sHVACKey" in "zHVAC" a doControl setpoint override will be sent to force a temporary setpoint change to 72 degrees to revert settings as closely back to normal as possible. Alternatively, we could send each unit an OFF override for 1 minute which would require the program halt for a minute.

Next, (2) a map (e.g., named "mResults") may then be analyzed for potential issues. To perform the analysis the following functionality may be performed:

g. Define new list, "zExceptions"
h. for each "sResHVACKey" in "mResults"
   i. if "RequestDataErr" is reporting any errors; add to "zExceptions" a string indicating "'sResHVACKey' reporting error 'RequestDataErr'"
i. If "bCool,"
   i. If ("Zone" − 6) < "Supply"
      1. Add to "zExceptions" a string indicating " 'sResHVACKey' supply out of spec after 'sRuntime' of cooling."
      2. "sSetpoint" = 115
j. Else
   i. If("Zone" + 6) > "Supply"
      1. Add to "zExceptions" a string indicating " 'sResHVACKey' supply out of spec after 'sRuntime' of heating."
      2. "sSetpoint" = 45

Next (3) the automated testing examines each unit individually to verify supply sensor placement as well as proper operation running the converse test of that ran in "round1" a previous test. Individual unit test results may be analyzed in a temporary map, (e.g., named "mIndvResults") with exceptions appended to list, (e.g., named "zExceptions"). Finally data from the individual unit's performance after test may be added to a new map, (e.g., named "mResults2"). The following functionality may be performed:

k. Define new empty map, "mIndvResults"
l. Define new empty map, "mResults2"
m. Define new list, "zAllHVACs"
n. Initialize list with HVAC keys of all HVACs for selected "sSchema"/"iSite" combination.
o. Define a number, "numTime"
p. Initialize "numTime" with value of # of elements in [("zAllHVACs" × 10) + 10]
q. For each "sAllHVACKey" in "zAllHVACs" override HVAC into OFF strategy for "numTime"
r. Wait 10 minutes (changeover delay)
s. For each "sHVACKey" in "zHVAC"
   i. Remove OFF override for "sHVACKey"
   ii. Using doControl setpoint override, override "sHVACKey" setpoint to "sSetpoint"
   iii. Delay 5-10min
   iv. for each "sAllHVACKey" in "zAllHVACs," RequestData will be parsed, recording "TimeStamp," "Zone," "Supply," "sRelayState," "sRuntime" and "RequestDataErr" into a list, then added into map, "mIndvResults, " mapped by "sAllHVACKey."
   v. Send doControl override to "sHVACKey" to revert setpoint to 72
   vi. For "sHVACKey" in "mIndvResults"
      1. if "RequestDataErr" is reporting any errors; add to "zExceptions" a string indicating "'sHVACKey' reporting error 'RequestDataErr'".
      2. If "bCool
         a. If("Zone" + 6) > "Supply"
            a. Add to "zExceptions" a string indicating "'sHVACKey' supply out of spec after 'sRuntime' of heating."
         b. For each "sIndHVACKey" in "mIndvResults"
            1. If("Zone" + 10) > "Supply"
               a. Add to "zExceptions" a string indicating "'sIndHVACKey' supply sensor possibly crossed with 'sHVACKey'"
      3. Else
         a. If("Zone" − 6) < "Supply"
            a. Add to "zExceptions" a string indicating "'sHVACKey' supply out of spec after 'sRuntime' of cooling."
         b. For each "sIndHVACKey" in "mIndvResults"
            1. If("Zone" − 10) < "Supply"
               a. Add to "zExceptions" a string indicating "'sIndHVACKey' supply sensor possibly crossed with 'sHVACKey'"
   vii. Take "sHVACKey" data from "mIndvResults" and add to "mResults2"
   viii. Empty map, "mIndvResults"
t. For each "sAllHVACKey" in "zAllHVACs" overrides will be cleared and a doControl setpoint override will be sent to force a temporary setpoint change to 72 degrees to revert settings as closely back to normal as possible. Alternatively, we could send each unit an OFF override for 1 minute which would require the program halt for a minute.

A list (e.g., named "zExceptions") has now been generated indicating all potential exceptions encountered with the tests, a map of lists (e.g., named "mResults") containing the data from the initial "all unit heat or cool test" mapped by HVAC key and a $3^{rd}$ map of lists (e.g., named "mResults2") containing the data from the "individual unit tests" mapped by HVAC key.

HVAC functionality tests may be presented as a report output format. This report with the results may be emailed to a requestor of the testing. The report may include a top section highlighting all issues identified in testing (e.g., a list named "zExceptions"). Below the top section, all tested units may be displayed in either heating or cooling (whichever the test began with) as a map (e.g., named "mResults") that is formatted to a table format. Additionally, the repost may include each unit displayed individually in the converse mode as a map (e.g., named "mResults2") formatted to a table format.

If test is abandoned at any point or encounters an error and has to close, the initiator and service may be notified of the premature halt.

As one illustrative example, the output of the testing may include the following:

Exceptions illustrated, for example, in Table 2

TABLE 2

RTU2 Analog 1 reading error
RTU2 Supply out of spec after 6:00 of cooling
RTU1 Supply out of spec after 6:00 of heating Results of a Cooling Test illustrated, for example, in Table 3

TABLE 3

| HVAC | Timestamp | Zone | Supply | RelayState | Runtime |
|---|---|---|---|---|---|
| HVAC1 | 6/3/2001 01:00 | 72 | 53 | FCChhxx | 6:00 |
| HVAC2 | 6/3/2001 01:00 | 32 | 75 | Fcchhxx | 6:00 |

Results of Heating Test illustrated, for example, in Table 4

TABLE 4

| HVAC | Timestamp | Zone | Supply | RelayState | Runtime |
|---|---|---|---|---|---|
| HVAC1 | 6/3/2001 01:10 | 72 | 71 | FccHHxx | 6:00 |
| HVAC2 | 6/3/2001 01:21 | 32 | 75 | Fcchhxx | 6:00 |

To prevent overheating or overcooling a zone, tested DZC will be overridden to OFF for 1 minute to revert the setpoint of the DZC back to normal and to reset the temporary setpoint change timer. An initiator may also stop test prior to completion if needed.

If problems are encountered the following error handling procedures may be implemented. If the HVAC system is not heating or cooling properly: units may be placed into heating or cooling for 6 minutes for individual test, 10 minutes for simultaneous test; results are analyzed after 6 minutes for 6 degree split between zone and supply; desired cooling average temperature—15 (DELTA_T_COOL); and desired heating average temperature—20 (DELTA_T_HEAT).

If the HVAC zone/supply sensors are swapped: during 6 min wait times while units are heating or cooling, zone and supply temperatures may be recorded once per minute; and current zone temperature is compared with a previous minute zone temperature. During a cooling test, if a current zone is five degrees or less than previous zone and supply is greater than zone, the unit is flagged as potentially having sensors that are swapped. Similarly, during a heating test, if current zone is five degrees or more than previous zone and supply is less than zone, the unit is flagged as potentially having sensors that are swapped. These procedures may be called "deltaT" in "anlResultsIntrmdIndv" and "analyzeResultsIntrmd" methods.

If supply sensors are swapped between DZC's units may be tested simultaneously in either heating or cooling initially. After this test is complete, the converse test is run on each unit individual. The results may be analyzed after six minutes. If during a unit's individual test, the unit is found to not be heating or cooling sufficiently, all other DZCs on sites' zone and supply temperatures are analyzed for a −10 degree split (in cooling) or +10 degree split (in heating). All DZCs but the tested DZC are in OFF mode during this test. Units exceeding this split are flagged. HVACs that achieve a desired "DELTA_T_HEAT/COOL" split during their individual test may be excluded from this comparison. Also, HVACs that achieve a five degree per minute rate of change in the correct direction during their individual test (e.g., +5 for heat −5 for cool) are excluded from this comparison. The rate of change variable is the same as the "deltaT" in the "anlResultsIntrmdIndv" method. The 10 degree "swapSensorDeltaT" variable may be found in the "analyzeResultsIndv" method.

If heat or cool relays swapped or incorrect reversing valve mode results are analyzed after 6 minutes in heating or cooling. If the supply is 10 degrees less than zone in heating mode, the unit is flagged. If the supply is 10 degrees greater than zone in cooling mode, the unit is flagged. These testing procedures are called "swapRelaysDeltaT" in "analyzeResultsIndv" and "analyzeResultsAll" methods.

If intermittent DZC are commissioned, during six minute wait times, while units are simultaneously heating or cooling, DZC timestamps are recorded once per minute. If at the end of the six minute wait time, a previous minute's timestamp is equal to current DC timestamp, the unit is flagged. After a simultaneous test the individual tests begin. DZC relay state is monitored for up to fourteen minutes to switch into heating or cooling. If after fourteen minutes, the DZC has not switched into the correct relay state, and the previous minute time stamp is equal to the current timestamp, the DZC is flagged. If the DZC goes into correct relay state during the fourteen minute wait time, a six minute wait time is initiated to achieve proper heating or cooling. If previous minute time stamp is equal to current timestamp after this six minute period, the DZC is flagged.

If a total number of DZC are not commissioned, whenever a setpoint change is attempted on a DZC that has not polled since a SCREAM application last started, an http response 500 is received. Whenever this response is encountered, the exception is caught and the DZC is removed from the rest of the test. This is logged in an error log. If the setpoint change for all DZCs specified for test fails in this fashion, the test is terminated and all DZCs are flagged. Also, if at the end of the initial six minute wait time for the simultaneous heating or cooling test, the previous minute's timestamp is the same as the current timestamp on all tested DZCs, the test is terminated and all DZCs are flagged. If a DZC is found to be in commission loss during its individual test, all other DZCs are analyzed at the end of the individual unit's test period for commission loss. Test ends of all are found in commission loss.

If an overcurrent flag is identified, after six minutes of heating or cooling during simultaneous test, a DZC relay state is analyzed. DZCs in either "fcchhxx" or "fcchhxxx" state are flagged. After the simultaneous tests complete the individual tests begin. The DZC relay state is monitored for up to fourteen minutes to switch into heating or cooling. If after fourteen minutes, the DZC has not switched into the correct relay state, and the DZC is communicating, the relay state is analyzed. DZCs in either "fcchhxx" or "fcchhxxx" state are flagged. If DZC switches into the correct heating or cooling mode but ends up in either "fcchhxx" or "fcchhxxx" state after six minutes and is communicating, the DZC is flagged.

If invalid zone or supply readings are identified, after six minutes in heating or cooling, zone/supply readings are analyzed. A test is performed that flags DZC if 40>zone>90 or 40>supply>140. DZCs with sensor readings outside these ranges are removed from test when found.

If there are connection issues, for example, if any http request during a test takes longer than ten seconds to complete, the test "sleeps" three minutes and then retries. If an http request fails a third time, the test is terminated. Retry attempts and final failure exception are logged in an error log.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for automated functionality testing for a heating ventilation and air conditioning (HVAC) system, the method comprising:
    receiving a user input to test one of a heating or cooling functionality of the HVAC system;
    identifying an amount to change a setpoint for a zone controller for the HVAC system based on the user input;
    changing the setpoint for the zone controller to force the HVAC system into one of a heating mode and a cooling mode in accordance with the user input;
    storing data from the HVAC system operating in the one of the heating mode and the cooling mode; and
    determining whether the HVAC system has been installed properly based on the stored data,
    wherein:
        the HVAC system comprises a plurality of HVAC systems installed at one or more locations,
        each of the HVAC systems is controlled by a separate one of a plurality of zone controllers, respectively, and
        determining whether the HVAC system has been installed properly comprises determining whether supply temperature sensors for two or more of the zone controllers have been switched during installation based on the stored data.

2. The method of claim 1, wherein determining whether the HVAC system has been installed properly further comprises determining whether a zone temperature sensor and a supply temperature sensor for the HVAC system have been switched during installation based on the stored data.

3. The method of claim 2, wherein determining whether the zone temperature sensor and the supply temperature sensor have been switched comprises:
    during the cooling mode, comparing a current zone temperature measured using the zone temperature sensor with a previous zone temperature measured using the zone temperature sensor; and
    when the current zone temperature is equal to or within a threshold temperature of the previous zone temperature and a supply temperature measured using the supply temperature sensor is greater than the current zone temperature, determining that the zone temperature sensor and the supply temperature sensor may have been switched during installation.

4. The method of claim 1, wherein changing the setpoint for the zone controller to force the HVAC system into one of the heating mode and the cooling mode and storing data from the HVAC system operating in the one of the heating mode and the cooling mode comprises:
    changing the setpoint for the zone controllers for each of the HVAC systems to force the HVAC systems into one of the heating mode and the cooling mode to test the HVAC systems simultaneously, and storing data from each of the HVAC systems simultaneously operating in the one of the heating mode and the cooling mode; and
    then changing the setpoint for zone controllers for each of the HVAC systems to force the HVAC systems into one of the heating mode and the cooling mode to test the HVAC systems individually, and storing data from each of the HVAC systems individually operating in the one of the heating mode and the cooling mode.

5. The method of claim 4, wherein determining whether supply temperature sensors for two or more of the zone controllers have been switched during installation comprises determining that the HVAC systems controlled by the two or more of the zone controllers appeared to properly cool or heat during the simultaneous test of the HVAC systems based on the stored data from each of the HVAC systems simultaneously operating but did not appear to properly cool or heat during the individual test of the HVAC systems based on the stored data from each of the HVAC systems individually operating.

6. A data processing system for automated functionality testing for a heating ventilation and air conditioning (HVAC) system, the data processing system comprising:
    a storage device comprising a testing application;
    an accessible memory comprising instructions of the testing application; and
    a processor configured to execute the instructions of the testing application to:
        receive a user input to test one of a heating or cooling functionality of the HVAC system;
        identify an amount to change a setpoint for a zone controller for the HVAC system based on the user input;
        change the setpoint for the zone controller to force the HVAC system into one of a heating mode and a cooling mode in accordance with the user input;
        store data from the HVAC system operating in the one of the heating mode and the cooling mode; and
        determine whether the HVAC system has been installed properly based on the stored data,
    wherein:
        the HVAC system comprises a plurality of HVAC systems installed at one or more locations,
        each of the HVAC systems is controlled by a separate one of a plurality of zone controllers, respectively, and to determine whether the HVAC system has been installed properly, the processor is configured to execute the instructions of the testing application to determine whether supply temperature sensors for two or more of the zone controllers have been switched during installation based on the stored data.

7. The data processing system of claim 6, wherein to determine whether the HVAC system has been installed properly, the processor is further configured to execute the instructions of the testing application to determine whether a zone temperature sensor and a supply temperature sensor for the HVAC system have been switched during installation based on the stored data.

8. The data processing system of claim 7, wherein to determine whether the zone temperature sensor and the supply temperature sensor have been switched, the processor is configured to execute the instructions of the testing application to:
during the cooling mode, compare a current zone temperature measured using the zone temperature sensor with a previous zone temperature measured using the zone temperature sensor; and
when the current zone temperature is equal to or within a threshold temperature of the previous zone temperature and a supply temperature measured using the supply temperature sensor is greater than the current zone temperature, determine that the zone temperature sensor and the supply temperature sensor may have been switched during installation.

9. The data processing system of claim 6, wherein to change the setpoint for the zone controller to force the HVAC system into one of the heating mode and the cooling mode and store data from the HVAC system operating in the one of the heating mode and the cooling mode, the processor is configured to execute the instructions of the testing application to:
change the setpoint for the zone controllers for each of the HVAC systems to force the HVAC systems into one of the heating mode and the cooling mode to test the HVAC systems simultaneously, and store data from each of the HVAC systems simultaneously operating in the one of the heating mode and the cooling mode; and
then change the setpoint for zone controllers for each of the HVAC systems to force the HVAC systems into one of the heating mode and the cooling mode to test the HVAC systems individually, and store data from each of the HVAC systems individually operating in the one of the heating mode and the cooling mode.

10. The data processing system of claim 9, wherein to determine whether supply temperature sensors for two or more of the zone controllers have been switched during installation, the processor is configured to execute the instructions of the testing application to determine that the HVAC systems controlled by the two or more of the zone controllers appeared to properly cool or heat during the simultaneous test of the HVAC systems based on the stored data from each of the HVAC systems simultaneously operating but did not appear to properly cool or heat during the individual test of the HVAC systems based on the stored data from each of the HVAC systems individually operating.

11. A data processing system for automated functionality testing for a heating ventilation and air conditioning (HVAC) system, the data processing system comprising:
a storage device comprising a testing application;
an accessible memory comprising instructions of the testing application; and
a processor configured to execute the instructions of the testing application to:
receive a user input to test one of a heating or cooling functionality of the HVAC system;
identify an amount to change a setpoint for a zone controller for the HVAC system based on the user input;
change the setpoint for the zone controller to force the HVAC system into one of a heating mode and a cooling mode in accordance with the user input; and
store data from the HVAC system operating in the one of the heating mode and the cooling mode; and
determine whether the HVAC system has been installed properly based on the stored data, wherein to determine whether the HVAC system has been installed properly, the processor is configured to execute the instructions of the testing application to determine whether a zone temperature sensor and a supply temperature sensor for the HVAC system have been switched during installation based on the stored data, and wherein to determine whether the zone temperature sensor and the supply temperature sensor have been switched, the processor is configured to execute the instructions of the testing application to:
during the heating mode, compare a current zone temperature measured using the zone temperature sensor with a previous zone temperature measured using the zone temperature sensor; and
when the current zone temperature is equal to or beyond a threshold temperature of the previous zone temperature and a supply temperature measured using the supply temperature sensor is less than the current zone temperature, determine that the zone temperature sensor and the supply temperature sensor may have been switched during installation.

12. A method for automated functionality testing for a heating ventilation and air conditioning (HVAC) system, the method comprising:
receiving a user input to test one of a heating or cooling functionality of the HVAC system;
identifying an amount to change a setpoint for a zone controller for the HVAC system based on the user input;
changing the setpoint for the zone controller to force the HVAC system into one of a heating mode and a cooling mode in accordance with the user input;
storing data from the HVAC system operating in the one of the heating mode and the cooling mode; and
determining whether the HVAC system has been installed properly based on the stored data wherein determining whether the HVAC system has been installed properly comprises determining whether a zone temperature sensor and a supply temperature sensor for the HVAC system have been switched during installation based on the stored data, and wherein determining whether the zone temperature sensor and the supply temperature sensor have been switched comprises:
during the heating mode, comparing a current zone temperature measured using the zone temperature sensor with a previous zone temperature measured using the zone temperature sensor; and
when the current zone temperature is equal to or beyond a threshold temperature of the previous zone temperature and a supply temperature measured using the supply temperature sensor is less than the current zone temperature, determining that the zone temperature sensor and the supply temperature sensor may have been switched during installation.

13. A non-transitory computer-readable medium encoded with executable instructions for automated functionality testing for a heating ventilation and air conditioning (HVAC)

system, the executable instructions, when executed, cause one or more data processing systems to:
- receive a user input to test one of a heating or cooling functionality of the HVAC system;
- identify an amount to change a setpoint for a zone controller for the HVAC system based on the user input;
- change the setpoint for the zone controller to force the HVAC system into one of a heating mode and a cooling mode in accordance with the user input;
- store data from the HVAC system operating in the one of the heating mode and the cooling mode; and
- determine whether the HVAC system has been installed properly based on the stored data, wherein:
- the HVAC system comprises a plurality of HVAC systems installed at one or more locations,
- each of the HVAC systems is controlled by a separate one of a plurality of zone controllers, respectively, and
- the executable instructions that, when executed, cause the one or more data processing systems to determine whether the HVAC system has been installed properly comprise executable instructions that, when executed, cause the one or more data processing systems to determine whether supply temperature sensors for two or more of the zone controllers have been switched during installation based on the stored data.

14. The computer-readable medium of claim 13, wherein the executable instructions that, when executed, cause the one or more data processing systems to determine whether the HVAC system has been installed properly further comprise executable instructions that, when executed, cause the one or more data processing systems to determine whether a zone temperature sensor and a supply temperature sensor for the HVAC system have been switched during installation based on the stored data.

15. The computer-readable medium of claim 14, wherein the executable instructions that, when executed, cause the one or more data processing systems to determine whether the zone temperature sensor and the supply temperature sensor have been switched comprise executable instructions that, when executed, cause the one or more data processing systems to:
- during the cooling mode, compare a current zone temperature measured using the zone temperature sensor with a previous zone temperature measured using the zone temperature sensor; and
- when the current zone temperature is equal to or within a threshold temperature of the previous zone temperature and a supply temperature measured using the supply temperature sensor is greater than the current zone temperature, determine that the zone temperature sensor and the supply temperature sensor may have been switched during installation.

16. The computer-readable medium of claim 13, wherein:
the executable instructions that, when executed, cause the one or more data processing systems to change the setpoint for the zone controller to force the HVAC system into one of the heating mode and the cooling mode and store data from the HVAC system operating in the one of the heating mode and the cooling mode comprise executable instructions that, when executed, cause the one or more data processing systems to:
- change the setpoint for the zone controllers for each of the HVAC systems to force the HVAC systems into one of the heating mode and the cooling mode to test the HVAC systems simultaneously, and store data from each of the HVAC systems simultaneously operating in the one of the heating mode and the cooling mode; and
- then change the setpoint for zone controllers for each of the HVAC systems to force the HVAC systems into one of the heating mode and the cooling mode to test the HVAC systems individually, and store data from each of the HVAC systems individually operating in the one of the heating mode and the cooling mode, and the executable instructions that, when executed, cause the one or more data processing systems to determine whether supply temperature sensors for two or more of the zone controllers have been switched during installation comprise executable instructions that, when executed, cause the one or more data processing systems to determine that the HVAC systems controlled by the two or more of the zone controllers appeared to properly cool or heat during the simultaneous test of the HVAC systems based on the stored data from each of the HVAC systems simultaneously operating but did not appear to properly cool or heat during the individual test of the HVAC systems based on the stored data from each of the HVAC systems individually operating.

17. A non-transitory computer-readable medium encoded with executable instructions for automated functionality testing for a heating ventilation and air conditioning (HVAC) system, the executable instructions, when executed, cause one or more data processing systems to:
- receive a user input to test one of a heating or cooling functionality of the HVAC system;
- identify an amount to change a setpoint for a zone controller for the HVAC system based on the user input;
- change the setpoint for the zone controller to force the HVAC system into one of a heating mode and a cooling mode in accordance with the user input;
- store data from the HVAC system operating in the one of the heating mode and the cooling mode; and
- determine whether the HVAC system has been installed properly based on the stored data wherein the executable instructions that, when executed, cause the one or more data processing systems to determine whether the HVAC system has been installed properly comprise executable instructions that, when executed, cause the one or more data processing systems to determine whether a zone temperature sensor and a supply temperature sensor for the HVAC system have been switched during installation based on the stored data, and wherein the executable instructions that, when executed, cause the one or more data processing systems to determine whether the zone temperature sensor and the supply temperature sensor have been switched comprise executable instructions that, when executed, cause the one or more data processing systems to:
- during the heating mode, compare a current zone temperature measured using the zone temperature sensor with a previous zone temperature measured using the zone temperature sensor; and
- when the current zone temperature is equal to or beyond a threshold temperature of the previous zone temperature and a supply temperature measured using the supply temperature sensor is less than the current zone temperature, determine that the zone temperature sensor and the supply temperature sensor may have been switched during installation.

* * * * *